(12) United States Patent
Kashima (10) Patent No.: US 7,716,145 B2
(45) Date of Patent: May 11, 2010

(54) SYSTEM FOR SUPPORTING USER'S BEHAVIOR

(75) Inventor: Hisashi Kashima, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/192,792

(22) Filed: Aug. 15, 2008

(65) Prior Publication Data

US 2008/0319931 A1 Dec. 25, 2008

Related U.S. Application Data

(63) Continuation of application No. 11/550,846, filed on Oct. 19, 2006, now Pat. No. 7,467,120.

(30) Foreign Application Priority Data

Nov. 8, 2005 (JP) ............... 2005-323404

(51) Int. Cl.
*G06F 15/18* (2006.01)
(52) U.S. Cl. ...................................................... 706/14
(58) Field of Classification Search ............ 705/37, 705/1, 35, 38; 706/36 R, 37, 38, 14
See application file for complete search history.

(56) References Cited

OTHER PUBLICATIONS

'An iterative method for multi-class cost-sensitive learning': Abe, Aug. 22-25, 2004, ACM, 1-58113-888.*

Jun-Ya Goto, and Akiko Takeda, Linear decision model based on Conditional Geometric Score, Abstract collection of Spring Meeting for reading Research Paper by the Operations Research Society of Japan, Mar. 2005.
Elkan, "The Foundations of Cost-Sensitive Learning", Proc. Of $17^{th}$ Inter. Joint Conference of Artificial Intelligence, pp. 1-6, 2001.
Abe et al., "An Iterative Method for Multi-Class Cost-Insensitive Learning", pp. 1-9.
Pedro Domingos, "MetaCost: A General Method for Making Classifiers Cost-Sensitive", pp. 155-164.
Geibel et al., "Perception and SVM Learning With Generalized Cost Models", Feb. 13, 2004, pp. 1-29.
Rockafellar et al., "Optimization of Conditional Value-At-Risk", Sep. 5, 1999, pp. 1-26.
Zadrozny et al., "Cost-Sensitive Learning by Cost-Proportionate Example Weighting", pp. 1-8.

* cited by examiner

*Primary Examiner*—Donald Sparks
*Assistant Examiner*—Peter Coughlan
(74) *Attorney, Agent, or Firm*—Shimokaji & Associates, P.C.

(57) ABSTRACT

Provided is a system 10 which supports a user's behavior by generating a behavioral decision function indicating behavior to be adopted to a certain target. The system 10 includes: a data acquiring section 110 which acquires a cost caused as a result of adopting each of a plurality of behaviors to a target as training data for generating the behavioral decision function, the plurality of behaviors having already been adopted to the target; and a function generator 120 which generates, based on the training data, the behavioral decision function to minimize the expected shortfall of a cost to be obtained as a result of adopting the behavior to the target.

6 Claims, 5 Drawing Sheets

FIG. 1

| TYPES OF TEST RESULT | LOSSES OF TREATMENT POLICY 1 | LOSSES OF TREATMENT POLICY 2 |
|---|---|---|
| ⋮ | ⋮ | ⋮ |
| RESULT A | 10 | 6 |
| RESULT A | 1 | 5 |
| ⋮ | ⋮ | ⋮ |
| RESULT B | 8 | 6 |
| RESULT B | 7 | 7 |
| ⋮ | ⋮ | ⋮ |

SUBSTRACT VaR FROM EACH COST OF TRAINING DATA — S500

↓

CALCULATE BEHAVIORAL DECISION FUNCTION TO MINIMIZE EXPECTED SHORTFALL OF COST — S510

| Test ES (VaR) | Cost-Sensitive | Risk-Sensitive |
|---|---|---|
| $\beta = 0.01$ | 64.47 (46.59) | 55.34 (40.66) |
| $\beta = 0.05$ | 34.66 (17.67) | 30.13 (15.28) |
| $\beta = 0.10$ | 23.58 (10.16) | 23.04 (9.09) |
| $\beta = 0.20$ | 14.71 (3.30) | 14.40 (3.66) |
| Mean Cost | 3.31 | — |

FIG. 7

SYSTEM FOR SUPPORTING USER'S BEHAVIOR

BACKGROUND OF THE INVENTION

The present invention relates to a system for supporting a user's behavior, and particularly relates to a system which supports a user's behavior by generating a behavioral decision function.

Classification learning is studied as a basic technique of data mining. An object of the classification learning is to output behavior on a certain target, which should be adopted in the future, based on information showing the result of behavior which was adopted to the target in the past (hereinafter, referred to as training data). If this technique is applied, according to the past events, it is possible to suggest the most statistically appropriate (e.g., the number of errors is minimized) behavior to a user to support a user's behavior.

The classification learning can be applied to various technical fields as follows:

(1) Diagnosis in the Medical Field

Target: test result of patient

Behavior: whether or not a certain treatment should be performed

Training data in this example is information showing whether or not a certain treatment was successful when the treatment was performed in the past on a patient having a certain test result. According to the classification learning, it is possible to predict the appropriateness of a treatment on a future patient based on such training data.

(2) Credit Assessment in the Financial Field

Target: credit history of applicant for loan

Behavior: whether or not a loan is granted

Training data in this example is information showing whether or not a bond was collectible when a loan was made in the past for an applicant having a certain credit history. According to the classification learning, it is possible to judge whether or not to finance a certain applicant in the future based on such training data.

(3) Topic Classification in a Search Engine

Target: webpages of news

Behavior: classification into economic, sport, and political fields

Training data in this example is information showing whether or not the classification was appropriate when a certain webpage was classified into a certain field in the past. According to the classification learning, a webpage which will be created in the future can be classified appropriately based on such training data.

In general, an object of such classification learning is to accurately predict behavior to be adopted to a target. In other words, the classification learning aims to minimize the number and probability of errors in behaviors.

However, minimizing the number of errors alone may not be sufficient in some problems. For example, in the case of the above example (1), there is a clear difference between a loss (hereinafter, referred to as a cost) caused as a result of diagnosing a healthy patient with a disease and then performing an unnecessary treatment and a cost caused as a result of leaving a sick patient alone and then leading to his/her death. Moreover, there may be a case where a cost is different according to the social status of a patient. Similarly, in the case of the above example (2), a cost caused as a result of refusing a loan to an excellent applicant is an interest alone. However, a cost caused as a result of granting a loan to a bad applicant may be the entire amount of the loan. The cost is different also in this case according to the respective amount of his/her loan and degree of his/her badness.

As an applicable technique in such a case where costs are different among each target and behavior and they are unknown when prediction is made, cost-sensitive learning has conventionally been proposed (please refer to: N. Abe and B. Zadrozny. An interactive method for multi-class cost-sensitive learning. In Proceedings of ACM SIGKDD Conference, 2004; J. P. Bradford, C. Kunz, R. Kohavi, C. Brunk, and C. E. Brodley. Pruning decision trees with misclassification costs. In Proceedings of the $9^{th}$ European Conference on Machine Learning (ECML), 1998; P. Domingos. MetaCost: A general method for making classifier cost sensitive. In Proceedings of the $5^{th}$ International Conference on Knowledge Discovery and Data Mining, pages 155-164, 1999; C. Elkan. The foundations of cost-sensitive learning. In Proceedings of the $17^{th}$ International Joint Conference on Artificial Intelligence (IJCAI), pages 973-978, 2001; W. Fan, S. J. Stolfo, J. Zhang, and P. K. Chan. Ada-Cost: Misclassification cost sensitive boosting. In Proceedings of the $16^{th}$ International Conference on Machine Learning (ICML), pages 97-105, 1999; P. Geibel, U. Bredford, and F. Wysotzki. Perceptron and SVM learning with generalized cost models. Intelligent Data Analysis, 8(5):439-455, 2004; B. Zadrozny and C. Elkan. Learning and making decisions when costs and probabilities are both unknown. In Proceedings of ACM SIGKDD Conference, 2001; B. Zadrozny, J. Langford, and N. Abe. Cost-sensitive learning by cost-proportionate example weighting. In Proceedings of the $3^{rd}$ International Conference on Data Mining (ICDM), pages 435-442, 2003; and Suzuki. More Advantageous Learning than Accurate Learning—Classification Learning Considering Misclassification Costs—(1) (2). Information Processing, 45(4-5), 2004). An object of the cost-sensitive learning is not to minimize the rate of behavioral errors, but to minimize the expected value of a cost. Therefore, it is possible to handle problems in a wider range.

Hereinafter, more detailed descriptions will be given of the cost-sensitive learning. Firstly, problems targeted in the cost-sensitive learning will be defined by the following (1) to (3).

(1) Cost Function

A cost means an indicator which shows a loss caused as a result of behavior adopted to a certain target, for example. Assume that X is a set of targets (for example, $X=R^M$) and that Y is a set of behaviors which can be adopted to the targets. It should be noted that Y is assumed to be a discrete and finite set. A cost caused as a result of adopting behavior $y \in Y$ on a target $x \in X$ is assumed to be $c(x, y) \in R$.

For example, the badness of a result caused when a certain treatment y is performed on a patient having a test result x is $c(x, y)$. If the treatment is appropriate, $c(x, y)$ is small. If the treatment is inappropriate, $c(x, y)$ is large. If the treatment y is extremely inappropriate as a treatment for the patient and leads to his/her death, the cost becomes very large. Incidentally, in a problem setting (please refer to J. P. Bradford, C. Kunz, R. Kohavi, C. Brunk, and C. E. Brodley. Pruning decision trees with misclassification costs. In Proceedings of the $9^{th}$ European Conference on Machine Learning (ECML), 1998) in the early study stage, handled is a simple case where: the cost does not depend on x directly; classes are set as latent variables; the cost depends on the class and the behavior; and moreover, the scale of the cost is already known. Here, handled is a more common case where costs are different according to targets and a real cost function c(x, y) is unknown (please refer to B. Zadrozny and C. Elkan. Learning and making decisions when costs and probabilities are both unknown. In Proceedings of ACM SIGKDD Conference, 2001).

(2) Behavior Decision Model

X is assumed to be a set of targets (for example, $X=R^M$), and Y is assumed to be a (discrete and finite) set of behaviors which can be adopted for the targets. A function used for deciding the behavior y∈Y to the target x∈X is assumed to be the following equation (1).

(Equation 1)

$$h(x,y;\theta): X \times Y \to R \qquad \text{Equation 1}$$

Here, θ is a parameter of the model. In general, using this, behavior y' which should be adopted is alternatively decided by the following equation 2. h(x, y; θ) may have a probabilistic constraint as in the following equation 3.

(Equation 2)

$$y' = \underset{y \in Y}{\operatorname{argmax}}\, h(x, y; \theta) \qquad \text{Equation 2}$$

(Equation 3)

$$\sum_{y \in Y} h(x, y; \theta) = 1\, s.t.\, h(x, y; \theta) \geq 0 \qquad \text{Equation 3}$$

In other words, when the target x∈X is given, behavior decision on this may probabilistically be made by equation 3 instead of equation 2. Furthermore, it is also conceivable that the behavior decision is a resource distribution type, that is, it is a case where the number of behaviors which can actually be adopted is not one but a diversified investment can be made in h (x, y; θ) in terms of the resource in accordance with the proportion thereof. However, behavior is alternatively decided by equation 2 in the embodiment of the present invention.

In addition, c(x, h, (θ)) is assumed to be a cost caused when behavior on x is decided by using h(x, y; θ). In the case (1) of an alternative action, c(x, h(θ)) is described in the following equation 4.

(Equation 4)

$$c(x, h(\theta)) = c\left(x, \underset{y \in Y}{\operatorname{argmax}}\, h(x, y; \theta)\right) \qquad \text{Equation 4}$$

In a case of a diversified-investment typed action, the definition is not necessarily obvious. However, here, as a simpler case, c(x, h, (θ)) is assumed, as shown in equation 5, that a cost produced by each action is proportional to an investment amount.

(Equation 5)

$$c(x, h(\theta)) = \sum_{y \in Y} h(x, y; \theta) c(x, y) \qquad \text{Equation 5}$$

(3) Training Data

A target and a cost are considered to be uniformly generated from a probability distribution D defined by $X \times R^Y$, and a set E of N pieces of data which have been sampled from D is assumed to be given. Here, the i-th training data of E is assumed to be $e^{(i)} = (x^{(i)}, \{c^{(i)}(x^{(i)}, y)\} y \in Y)$. $x^{(i)} \in X$ is assumed to be the i-th target of the training data, and the cost $c^{(i)}(x^{(i)}, y)$ is assumed to be given to each action y∈Y on the i-th target.

With regard to the above problems, conventionally, used is a method whose object is to minimize the expected value of a cost in a classification problem which requires a consideration into a cost. Specifically, although θ is desired to be decided in a manner of minimizing an expected cost (equation 6) with respect to the distribution D of the data, since the distribution D is actually unknown, the parameter θ is to be decided in a manner of minimizing an experienced expectation cost (equation 7) (please refer to N. Abe and B. Zadrozny. An interactive method for multi-class cost-sensitive learning. In Proceedings of ACM SIGKDD Conference, 2004, P. Geibel, U. Bredford, and F. Wysotzki. Perceptron and SVM learning with generalized cost models. Intelligent Data Analysis, 8(5):439-455, 2004, and B. Zadrozny and C. Elkan. Learning and making decisions when costs and probabilities are both unknown. In Proceedings of ACM SIGKDD Conference, 2001)

(Equation 6)

$$C^D(\theta) = E_D[c(x, h(\theta))] \qquad \text{Equation 6}$$

(Equation 7)

$$C^E(\theta) = \frac{1}{N} \sum_{i=1}^{N} c(x^{(i)}, h(\theta)) \qquad \text{Equation 7}$$

It should be noted that it is considered that the target and the cost are generated from the probability distribution D which is defined by $X \times R^Y$, independently of each other. The set E of N pieces of the data, which has been sampled from D, is assumed to be given as the training data. Here, the i-th training data of E is assumed to be training data $e^{(i)} = (x^{(i)}, \{c^{(i)}(x^{(i)}, y)\} y \in Y)$. $x^{(i)} \in X$ is assumed to be the i-th target of the training data and a cost $c^{(i)}(x^{(i)}, y)$ of when adopting each behavior y∈Y is assumed to be given.

However, considering from a viewpoint of a risk management, an approach of simply minimizing an experienced expectation cost may not be sufficient. After the training, behavior is assumed to be adopted for M pieces of data. When M is large, a sum of their costs comes close to $M \cdot C^D(\theta)$. Hence, it seems that there is no problem setting $C^E(\theta)$ as an objective function of learning. However, since M is relatively small, the above approximation cannot hold true. Additionally, consideration is given to a case where the generation of a large amount of cost is critical. For example, in a case of a problem of deciding where to invest a fund, a fact that big mistakes occur consecutively some times is a serious problem which is directly connected to the risk of bankruptcy. When the probability of the occurrence is small but there is a possibility that a large amount of cost to an unacceptable degree occurs, a user should wish to avoid its risk as much as possible.

Furthermore, for example, assume that there are two decision functions h1 and h2 which can be expected to obtain the same cost expected values. Although a probability distribution of a cost brought by h1 has a high peak around the expected value, a probability distribution of a cost brought by h2 has a form which has gentle slopes and whose bottom side is wide in a high cost area. In this case, even if the expectation cost is the same, it is presumed that preferred is h1 whose possibility of the occurrence of a high cost is smaller. In such a case, it cannot be said that the object is correctly reflected by the minimization of an experienced expectation cost. Therefore, desired is a learning method in which a risk is avoided more actively, taking the distribution of a cost into consideration.

SUMMARY OF THE INVENTION

Hence, an object of the present invention is to provide a system, a method, and a program, which can solve the above problems. The object is achieved by combining the features recited in independent claims in the scope of claims. Additionally, dependent claims stipulate more advantageous, specific examples of the present invention.

In order to solve the above problems, in the embodiment of the present invention, provided are a system which supports the behavior of a user by generating a behavioral decision function showing behavior to be adopted to a certain target, including: a data acquiring section which acquires a cost caused as a result of adopting the behavior to the target as training data for generating a behavioral decision function, for each of a plurality of behaviors already adopted to the target; and a function generator which generates, based on the training data, a behavioral decision function to minimize the expected shortfall of the cost obtained as a result of adopting the behavior to the target, a program causing an information processor to function as the system, and a method which supports the behavior of a user with the system.

It should be noted that the above summary of the invention does not cite all the necessary features of the present invention, and that the subcombination of the groups of these features can be the invention.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Hereinafter, descriptions will be given of the present invention through an embodiment of the invention. However, the embodiment below is not intended to limit the invention to the scope of claims, and all the combinations of features described in the embodiment are not necessarily essential to the solving means of the invention.

Figure 1:
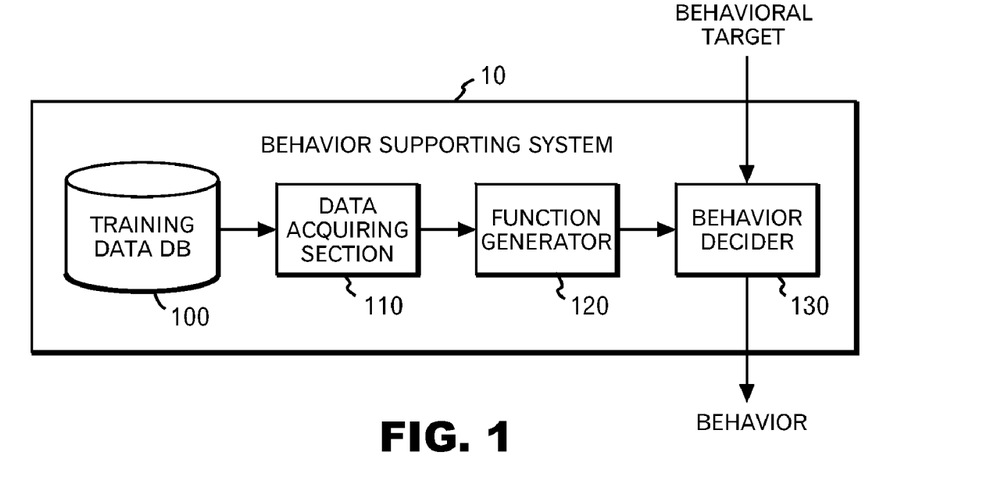
FIG. 1 shows a functional configuration of a behavior supporting system 10.

FIG. 1 shows a functional configuration of a behavior supporting system 10. The behavior supporting system 10 aims to support a decision on behavior to be adopted to a certain target by a user. As an example, the behavior supporting system 10 aims to support a doctor to make a decision on a treatment policy for a patient having a certain test result.

The behavior supporting system 10 includes a training data DB 100, a data acquiring section 110, a function generator 120, and a behavior decider 130. The training data DB 100 stores training data for causing the behavior supporting system 10 to generate a behavioral decision function. The training data, for example, shows a cost caused as a result of adopting a certain behavior on its target for each of a plurality of behaviors already adopted to the target. The training data may be generated based on the history of past behaviors on a certain target, or may be generated based on the result of each type of simulations and tests. In an example of supporting a decision on a medical policy, the training data is data showing the scale of a loss caused on a relevant patient for a plurality of patients who have already received treatment.

The data acquiring section 110 provides training data for the function generator 120 by acquiring the training data from the training data DB 100. The function generator 120 generates a behavioral decision function to minimize the expected shortfall of a cost obtained as a result of adopting behavior to a certain target, based on the training data. In the example of supporting a decision on a medical policy, a behavioral decision function is a function which decides a treatment policy for patients. In addition, the behavioral decision function is generated in a manner of minimizing the expected shortfall of a cost caused by a treatment. This function may uniquely output one treatment policy when a certain target is given, or may output an index value showing a degree of the appropriateness of each of the plurality of treatment policies.

When a target of a certain behavior is given, the behavior decider 130 decides behavior to be adopted to the target based on a behavioral decision function generated by the function generator 120, and notifies a user of the above. Accordingly, the user can know behavior to minimize an index value that conforms to an actual event, that is, expected shortfall, prior to a decision on the behavior. Consequently, the future risks can be reduced. In other words, specifically, a doctor can reduce the risk of leading an important patient to death due to a medical error, a financer can reduce the amount of a loan loss, and an investor can reduce the risk of bankruptcy.

Moreover, the expected shortfall of a cost on a certain target is shown as a value-at-risk (hereinafter, referred to as VaR and please refer to T. C. Cormen, C. E. Leiserson, and R. L. Rivest. Introduction to Algorithms. MIT Press, Cambridge, Mass., 1990) of a cost which can be obtained as a result of adopting behavior to its target and a function of a parameter θ of a behavioral decision function. Furthermore, in the embodiment, an index values which shows the upper bound of expected shortfall is adopted. This index value is shown as a function which is convex downward with regard to the VaR and the parameter θ. The function generator 120 of the embodiment firstly calculates the parameter θ to minimize the index value by fixing the VaR. Secondly, the function generator 120 calculates the VaR to minimize the index value by fixing the parameter θ. The function generator 120 repeats these calculations until the expected shortfall converges. In this manner, the behavior supporting system 10 of the embodiment can calculate an appropriate behavioral decision function rapidly by setting a risk indicator to be minimized as expected shortfall and by minimizing the index value whose upper bound is shown by the convex function.

Figure 2:
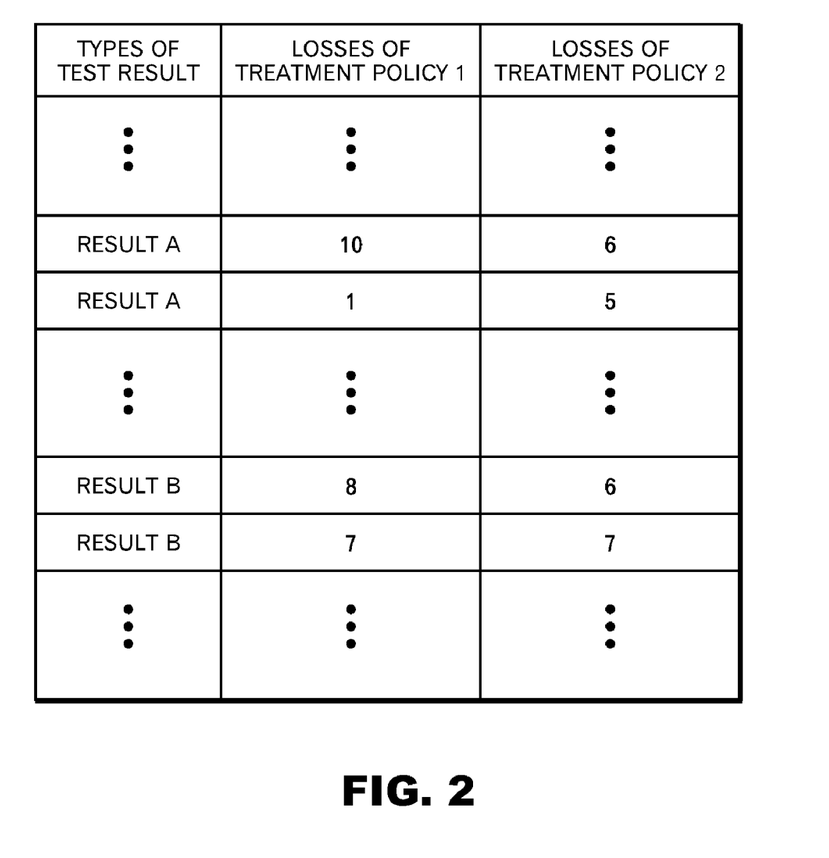
FIG. 2 shows an example of a data structure of a training data DB 100.

FIG. 2 shows an example of a data structure of the training data DB 100. The training data DB 100 stores a loss caused as a result of treating a patient, as training data. In the example of FIG. 2, a behavioral target corresponds to a test result, behavior corresponds to a treatment policy, and a loss corresponds to a drawback caused by a treatment. According to the training data stored in the training data DB 100, a loss is 10 in a case where a treatment is performed on a certain patient having a test result A with a treatment policy 1, and a loss is 6 in a case where a treatment is performed on the patient with a treatment policy 2. On the other hand, a loss is 1 in a case where a treatment is performed on another patient having the same test result A with the treatment policy 1, and a loss is 5 in a case where a treatment is performed on the patient with the treatment policy 2.

Although the loss is shown by being normalized with 1 to 10, a phenomenon shown as a result of a treatment, in reality, is shown by being converted into numbers, for example. In other words, for example, 10 shows a state of death or in conformance with death, and 1 shows a state of the appearance of the adverse effects of medication. Instead of this, the loss may be something that a phenomenon appearing as a result of a treatment is replaced with a monetary value.

Here, a mean loss of when a treatment is performed on the patient having the test result A with the treatment policy 1 is 5.5, and also a mean loss of when a treatment is performed with the treatment policy 2 is 5.5. In this manner, although the mean losses in both cases of the treatment policies 1 and 2 are 5.5, the maximum loss of the treatment policy 1 is 10 and the maximum loss of the treatment policy 2 is 6. Since a loss equivalent to death should be avoided, it can be judged in this example that the treatment policy 2, which has the smaller maximum loss, should be adopted even if the mean losses are the same. It is often difficult to make such a judgment in more complicated cases. However, it is possible to make such a judgment appropriately in the embodiment, by setting an indicator which should be minimized to be expected shortfall.

Similarly, a loss caused as a result of treating a certain patient having a test result B with the treatment policy 1 is 8, and a loss caused as a result of treating the patient with the treatment policy 2 is 6. On the other hands, a loss caused as a result of treating another patient having the same test result B with the treatment policy 1 is 7, and a loss caused as a result of treating the patient with the treatment policy 2 is 7.

As described above and shown in FIG. 2, the training data DB 100 stores a cost caused as a result of adopting a certain behavior to a certain target. The cost may be decided based on the history of the results of adopting actual behaviors in the past to the target, or may be decided based on the result of each type of test or simulations.

Figure 3:
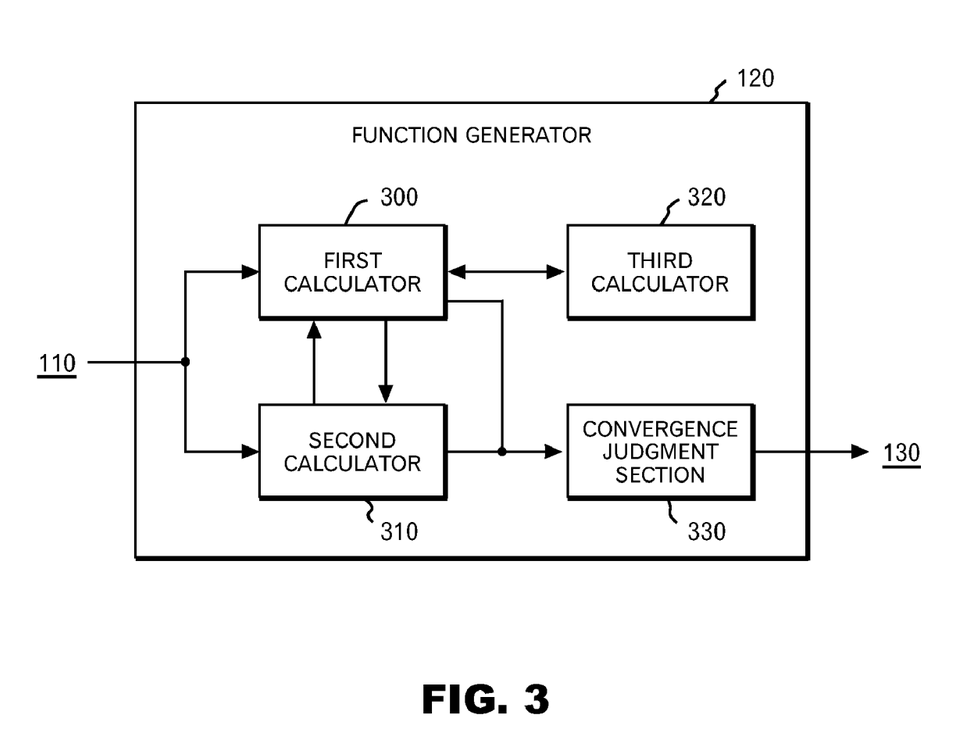
FIG. 3 shows a functional configuration of a function generator 120.

FIG. 3 shows a functional configuration of the function generator 120. The function generator 120 includes a first calculator 300, a third calculator 305, a second calculator 310, and a convergence judgment section 330. When a given value is set to be the VaR of a cost, the first calculator 300 calculates a behavioral decision function to minimize an index value based on the total amount of costs which exceeds the VaR, and stores the behavioral decision function in a memory. The index value, for example, is a predetermined value showing the upper bound of expected shortfall, and also a behavioral decision function of when minimizing the index value is known in advance to minimize the expected shortfall.

The third calculator 305 calculates a behavioral decision function to minimize the expected value of a cost based on training data. A technique to efficiently calculate the behavioral decision function to minimize the expected value of the cost is called a cost-sensitive algorithm. A method of realizing this technique is, for example, described in N. Abe and B. Zadrozny. An interactive method for multi-class cost-sensitive learning. In Proceedings of ACM SIGKDD Conference, 2004, P. Geibel, U. Bredford, and F. Wysotzki. Perceptron and SVM learning with generalized cost models. Intelligent Data Analysis, 8(5):439-455, 2004. and B. Zadrozny, J. Langford, and N. Abe. Cost-sensitive learning by cost-proportionate example weighting. In Proceedings of the $3^{rd}$ International Conference on Data Mining (ICDM), pages 435-442, 2003, and is conventionally and publicly known. Therefore, the descriptions will be omitted. The first calculator 300 subtracts the given VaR from costs which correspond respectively to behaviors included in the training data, and provides the result as new training data for the third calculator 305. Then, the first calculator 300 causes the third calculator 305 to calculate the behavioral decision function to minimize the expected value of a cost in the new training data. The calculated behavioral decision function becomes a behavioral decision function to minimize expected shortfall in a case where the given value is set to be a VaR.

The second calculator 310 reads the behavioral decision function calculated by the first calculator 300 from the memory, calculates the VaR of a cost caused as a result of adopting behavior indicated by the behavioral decision function based on the training data, and provides the result for the first calculator 300. The convergence judgment section 330 judges whether or not expected shortfall calculated based on the index value minimized by the first calculator 300 and the VaR calculated by the second calculator 310, have converged to a value within a predetermined range. The function generator 120 outputs the behavioral decision function calculated by the first calculator 300 on condition that the expected shortfall has converged.

In this manner, the function generator 120 alternatively calculates behavioral decision functions and VaRs which make the expected shortfall smaller, in order to cause the expected shortfall to come close to a minimum value. Then, a behavioral decision function at the point is outputted on condition that the expected shortfall has converged. At this point, since the upper bound of the expected shortfall is shown as a function which is convex downward with regard to the parameter $\theta$ and a VaR, a parameter $\theta$ and a VaR to minimize the expected shortfall, can be calculated with an algorithm which is greedy for $\theta$ and a VaR. Due to this, the expected shortfall approaches the minimum value everytime the behavioral decision function is calculated. Thus, it is made possible to calculate a target behavioral decision function efficiently. Furthermore, with regard to the calculation of a behavioral decision function, it is possible to utilize an existing technique to calculate the expected value of a cost in the third calculator 305, thus making it possible to make the process efficient by use of the accumulation of existing techniques.

Hereinafter, by use of FIGS. 4 and 5, descriptions will be given of the flow of the processes of the embodiment. Prior to the descriptions of the flow of the processes, descriptions will firstly be given of the process of leading an algorithm which calculates a behavioral decision function to minimize expected shortfall. The algorithm generates a behavioral decision function by calculating the parameter $\theta$ of the behavioral decision function. In other words, the behavioral decision function outputs the degree of appropriateness of the behavior by converting the degree into numbers while setting a target x, behavior y, and the parameter $\theta$ to be input, and the parameter to decide the nature of the behavioral decision function is set at $\theta$.

By using the parameter θ, expected shortfall is described as the following equation 8. It should be noted that, in equation 8, $[x]^+$ is assumed to be a function to return x when x is positive and 0 otherwise.

(Equation 8)

$$\phi_\beta^E(\theta) = \alpha_\beta^D(\theta) + \frac{1}{1-\beta} E_D[c(x, h(\theta)) - \alpha_\beta^D(\theta)]^+ \quad \text{Equation 8}$$

In this equation, the distribution D of a cost is unknown. Hence, a distribution E of the training data is used instead of the distribution D. Due to this, equation 8 can be rewritten as in equation 9. It should be noted that the target of behavior in the training data is denoted by $x^{(1)}$ to $x^{(n)}$ in equation 9. In addition, a behavioral decision function is denoted by a function h for deciding the behavior y to be adopted in accordance with the parameter θ while setting the target x to be input. Furthermore, a cost in the training data is denoted by $c(x^{(i)}, h(\theta))$. Moreover, a probability of the generation of a cost exceeding a VaR is set at a constant β.

(Equation 9)

$$\phi_\beta^E(\theta) = \alpha_\beta^E(\theta) + \frac{1}{(1-\beta)N} \sum_{i=1}^N [c(x^{(i)}, h(\theta)) - \alpha_\beta^E(\theta)]^+ \quad \text{Equation 9}$$

Here, $\alpha_\beta^E(\theta)$ is a VaR with respect to the distribution E of the training data, and is described by equation 10. It should be noted that a function I is assumed to be a function which adopts 1 when a condition shown by an argument is satisfied, and 0 when the condition is not satisfied.

(Equation 10)

$$\alpha_\beta^E(\theta) = \min\left\{\alpha \in R \;\middle|\; \frac{1}{N} \sum_{i=1}^N [I(c(x^{(i)}, h(\theta)) \geq \alpha)] \leq 1-\beta\right\} \quad \text{Equation 10}$$

Incidentally, given that $\alpha_\beta^E(\theta)$ is an already-known constant α' in equation 9, it is sufficient if only the following equation 11 included in the second term of equation 9 is minimized.

(Equation 11)

$$C_{\alpha'}^E(\theta) := \frac{1}{N} \sum_{i=1}^N [c(x^{(i)}, h(\theta)) - \alpha']^+ \quad \text{Equation 11}$$

It should be noted that a function $[x]^+$ is a convex function which is not reduced with respect to x. Therefore, if $c(x^{(i)}, h(\theta))$ is convex with respect to θ, equation 11, too, becomes convex likewise. Descriptions will later be given of an algorithm which minimizes equation 11.

Next, with regard to the given parameter θ, a VaR with respect to this θ is defined for the training data. Hence, the parameter θ can be described as in the following equations 12 and 13.

(Equation 12)

$$\alpha_\beta^E(\theta) = C(x^{(k')}, h(\theta)) \quad \text{Equation 12}$$

(Equation 13)

$$k' = \min\left\{k \;\middle|\; \frac{1}{N} \sum_{i=1}^N [I(c(x^{(i)}, h(\theta)) \geq c(x^{(k)}, h(\theta)))] \leq 1-\beta\right\} \quad \text{Equation 13}$$

This equals to the (1−β)·N-th (round down) largest one $(c(x^{(k)}, h(\theta))$ among costs generated by θ. Therefore, it is possible to find this by the algorithm obtaining an order statistic in O(N) period of time (please refer to T. C. Cormen, C. E. Leiserson, and R. L. Rivest. Introduction to Algorithms. MIT Press, Cambridge, Mass., 1990, for example).

Based on the above derivation, descriptions will hereinafter be given of the processes of calculating a behavioral decision function to minimize expected shortfall by use of FIG. 4.

Figure 4:
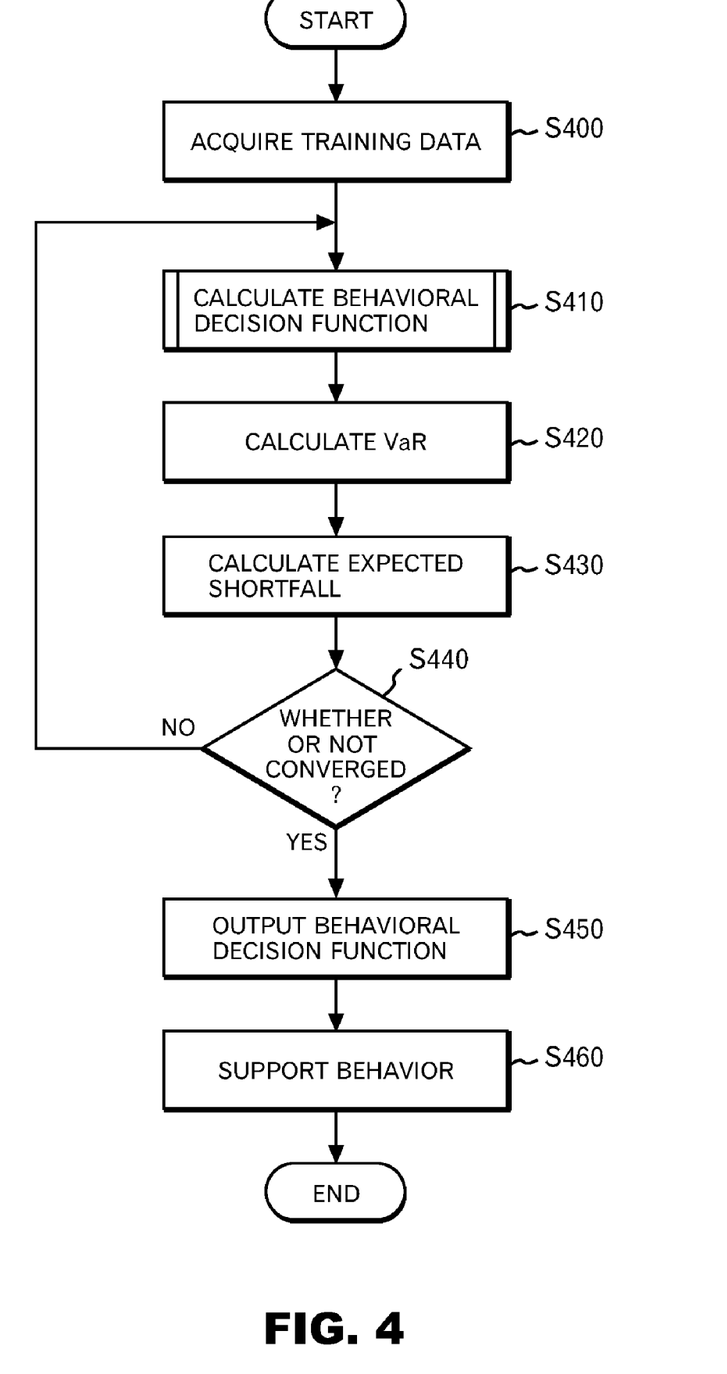
FIG. 4 shows a flowchart of processes that the behavior supporting system 10 supports a decision on a user's behavior.

FIG. 4 shows a flowchart of the processes that the behavior supporting system 10 supports a decision on the behavior of a user. The data acquiring section 110 acquires training data from the training data DB 100 (S400). Based on the training data, the function generator 120 performs the following processes. Firstly, when a given value is set to be the VaR of a cost, the first calculator 300 calculates, based on the training data, a behavioral decision function to minimize an index value based on the total amount of costs which exceed the VaR (S410). The given value is an initial value given in advance (for example, 0) in the first calculation, and a VaR given by the second calculator 310 in subsequent calculations. In details, the first calculator 300 calculates a parameter θ' of a behavioral decision function to minimize an index value $C_{\alpha'}^E(\theta)$ which is calculated by the above equation 11 while setting the given VaR at α'. The value of the parameter θ' is set at a new value of θ.

Next, the second calculator 310 calculates, based on the training data, a VaR of a cost caused as a result of adopting behavior shown by a behavioral decision function which is calculated by the first calculator 300 (S420). In details, the second calculator 310 calculates $\alpha_\beta^E(\theta)$ which is calculated by the above equations 12 and 13, as a VaR, with respect to the calculated parameter θ. Then, the second calculator 310 provides the value as α' for the first calculator 300.

Next, the convergence judgment section 330 calculates an index value $F_\beta^E(\theta, \alpha)$ showing the upper bound of expected shortfall, based on the index value $C_{\alpha'}^E$ minimized by the first calculator 300 and a VaR calculated by the second calculator 310 (S430). The index value, for example, is a value that a value that the index value of $C_{\alpha'}^E$ minimized by the first calculator divided by a probability (1−β) that a cost is equal to or below a value-at-risk, is added to the VaR. Additionally, the index value is shown by the following equation 14.

(Equation 14)

$$F_\beta^E(\theta, \alpha) = \alpha + \frac{1}{(1-\beta)N} \sum_{i=1}^N [c(x^{(i)}, h(\theta)) - \alpha]^+ \quad \text{Equation 14}$$

With regard to this equation 14, as shown in R. T. Rockafellar and S. Uryasev. Optimization of conditional value-at-risk. Journal of Risk, 2(3):21-41, 2000, it is known that the following equation 15 is satisfied. In addition, equation 14 is convex with respect to α, and equation 7 is convex with respect to θ. Therefore, equation 14 is convex with respect to θ and α. Furthermore, the following equation 16 holds true.

(Equation 15)

$$\min_{\theta} \phi_{\beta}^{E}(\theta) = \min_{\theta, \alpha} F_{\beta}^{E}(\theta, \alpha)$$ Equation 15

(Equation 16)

$$\alpha_{\beta}^{E}(\theta) = \min\left\{\alpha \in \operatorname*{argmin}_{\alpha} F_{\beta}^{E}(\theta, \alpha)\right\}$$ Equation 16

As shown above, it can be seen that when the index value of equation 16 converges to its minimum value, expected shortfall, too, converges to its minimum value. Moreover, the index value is shown by the functions of a VaR and θ, and becomes a function which is convex downward, with respect to the VaR and θ. Therefore, the convergence judgment section 330 judges whether or not expected shortfall has converged, by judging whether or not the index value of equation 16 converges to a value within a predetermined range (S440). It should be noted that since the VaR and θ, too, converge to predetermined values accompanied by the convergence of the expected shortfall, the convergence judgment section 330 may judge the convergence of expected shortfall by judging the convergence of the VaR, or may judge the convergence of expected shortfall by judging the convergence of θ.

If the expected shortfall has not converged (S440: NO), the function generator 120 returns the process to S410. In this case, the first calculator 300 recalculates the parameter θ by use of the VaR calculated in S420. On the other hand, on condition that the expected shortfall has converged (S440: YES), the function generator 120 outputs the parameter θ of a behavioral decision function calculated by the first calculator 300 (S450). The behavior decider 130 supports a user's behavior based on the behavioral decision function calculated by the above processes (S460).

Figure 5:
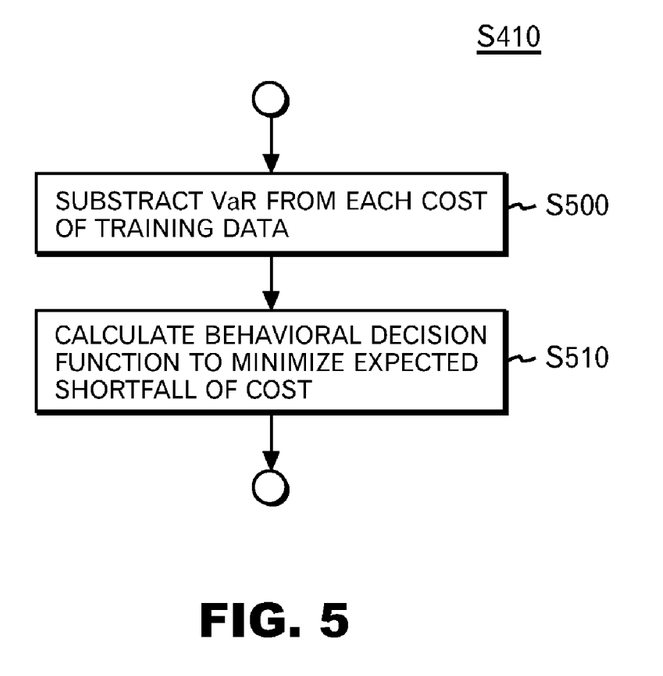
FIG. 5 shows the details of the processes of calculating a behavioral decision function in S410.

FIG. 5 shows the details of the processes of calculating a behavioral decision function in S410. In a case where behavior is alternatively decided by a behavioral decision function, a cost is limited to a form of $[C^{(i)}(x^{(i)}, y) - \alpha']^+ + \alpha'$. Considering the above equation 11 becomes the expected value of a cost exceeding α', equation 7 is shown as the following equation 18 by replacing the cost with an original cost in the following equation 17. Since this has the same form as equation 7, it is possible to minimize expected shortfall by providing a training example in which a cost is changed in an existing example-dependent cost-sensitive algorithm as in equation 17.

(Equation 17)

$$c'^{(i)}(x^{(i)}, y) = [c^{(i)}(x^{(i)}, y) - \alpha']^+$$ Equation 17

(Equation 18)

$$C'^{E}_{\alpha'}(\theta) = \frac{1}{N}\sum_{i=1}^{N} c'^{(i)}(x^{(i)}, y)$$ Equation 18

Considering the above, the first calculator 300 performs the following processes. Firstly, the first calculator 300 calculates a cost $c'^{(i)}$ by subtracting the given value-at-risk α' from a cost $c^{(i)}$ with respect to the target $x^{(i)}$ and the behavior y in the training data by equation 17, and provides the result for the third calculator 305 (S500). Then, the third calculator 305 calculates the parameter θ of a behavioral decision function to minimize a cost $C'^{E}_{\alpha'}(\alpha)$ shown by equation 18 (S510).

The cost $C'^{E}_{\alpha'}(\theta)$ shown by this equation 18 becomes the expected value of a cost found from the training data. An algorithm to calculate the expected value of a cost is conventionally studied in N. Abe and B. Zadrozny. An interactive method for multi-class cost-sensitive learning. In Proceedings of ACM SIGKDD Conference, 2004, P. Geibel, U. Bredford, and F. Wysotzki. Perceptron and SVM learning with generalized cost models. Intelligent Data Analysis, 8(5):439-455, 2004. and B. Zadrozny, J. Langford, and N. Abe. Cost-sensitive learning by cost-proportionate example weighting. In Proceedings of the 3$^{rd}$ International Conference on Data Mining (ICDM), pages 435-442, 2003, and the like, and its efficient execution method is known. The first calculator 300 of the embodiment can lead a problem of minimizing expected shortfall to a problem of minimizing the expected value of a cost, by subtracting a given VaR from each cost included in the training data. Expected shortfall can be thereby minimized efficiently by using an efficient algorithm which is conventionally studied.

Figure 6:
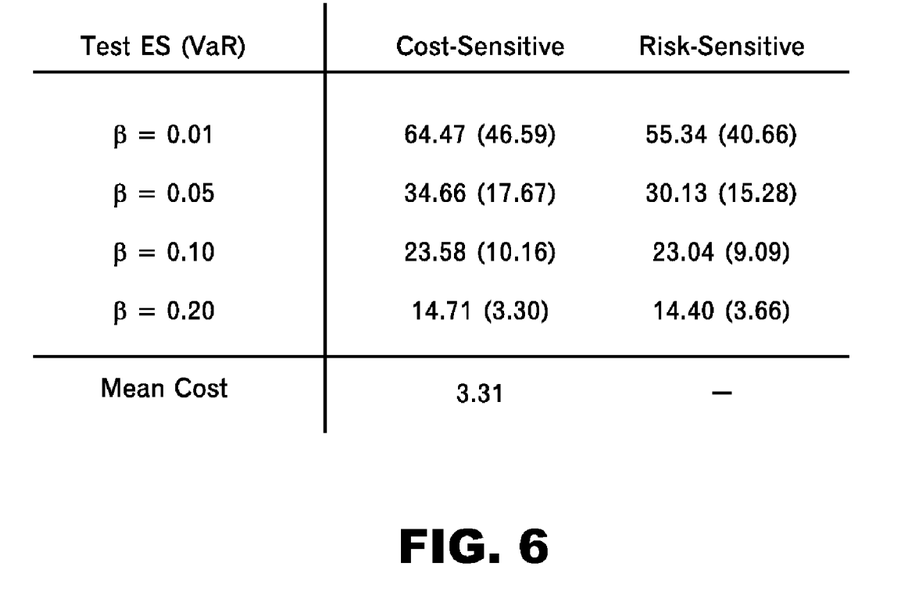
FIG. 6 shows a result of performing a test by the behavior supporting system 10 according to an embodiment.

FIG. 6 shows a result of performing a test by the behavior supporting system 10 according to the embodiment. As a test result, German Credit Data used in P. Geibel, U. Bredford, and F. Wysotzki. Perceptron and SVM learning with generalized cost models. Intelligent Data Analysis, 8(5):439-455, 2004, was used. A problem targeted by the test is a problem to predict the credit risk of a customer, and a problem to classify him/her into good or bad customers based on the customer's information. The attribute of customer's information x is composed of 20 items such as sex, job, the intended purpose of a fund, and a past history.

In this test, all the attributes attached to a dataset were converted into 24 numeric attributes. There are behaviors of two types of whether or not to make a loan. If a loan which should be made is not made, a loss equivalent to an interest occurs. On the other hand, a loan which should not be made is made, a loss equivalent to a large part of the loan amount occurs. Other conditions were in conformance with P. Geibel, U. Bredford, and F. Wysotzki. Perceptron and SVM learning with generalized cost models. Intelligent Data Analysis, 8(5): 439-455, 2004.

In the test, a model h(x, y) of a case of alternatively selecting an action and a weak hypothesis ft(x, y) of a case of a diversified-investment typed algorithm were used. In any case, used is a kernel-based cost-sensitive perceptron (please refer to P. Geibel, U. Bredford, and F. Wysotzki. Perceptron and SVM learning with generalized cost models. Intelligent Data Analysis, 8(5):439-455, 2004) as a cost-sensitive learning machine. The Gaussian kernel (σ=50) was used as a kernel function.

For the test result, a measurement was taken by use of the mean value of values obtained by 3 fold cross validation on data (666 training data and 334 test data). The column of Cost-Sensitive showed the results obtained by a conventional cost-sensitive perceptron in which an expected cost is set to be an objective function, and the column of Risk-Sensitive showed the results obtained by a proposal method in which expected shortfall is set to be an objective function (the respective cases of β=0.20, 0.10, 0.05 and 0.01).

Each line shows the mean of three times of expected shortfall in each β in the test data. Moreover, the figures within parentheses show value-at-risks in the respective cases. A Mean Cost line in the bottom of the Cost-Sensitive column shows mean costs. As expected, it can be seen that the expected shortfall in corresponding β could be reduced in the case of the cost-sensitive learning. The larger β becomes, the less dramatic the amount of reduction in the expected shortfall becomes in the risk-sensitive type. It is conceivable that this is because a difference between the expected shortfall and the expected costs becomes smaller since the cost distribution is heavily tilted toward the left side (in the vicinity of 0). Additionally, in β=0.20, it can be seen that a smaller value-at-risk was realized in the cost-sensitive type rather than the risk-sensitive type. This indicates that a small value-at-risk does not necessarily suppress the large cost itself which is caused with small probability.

Figure 7:
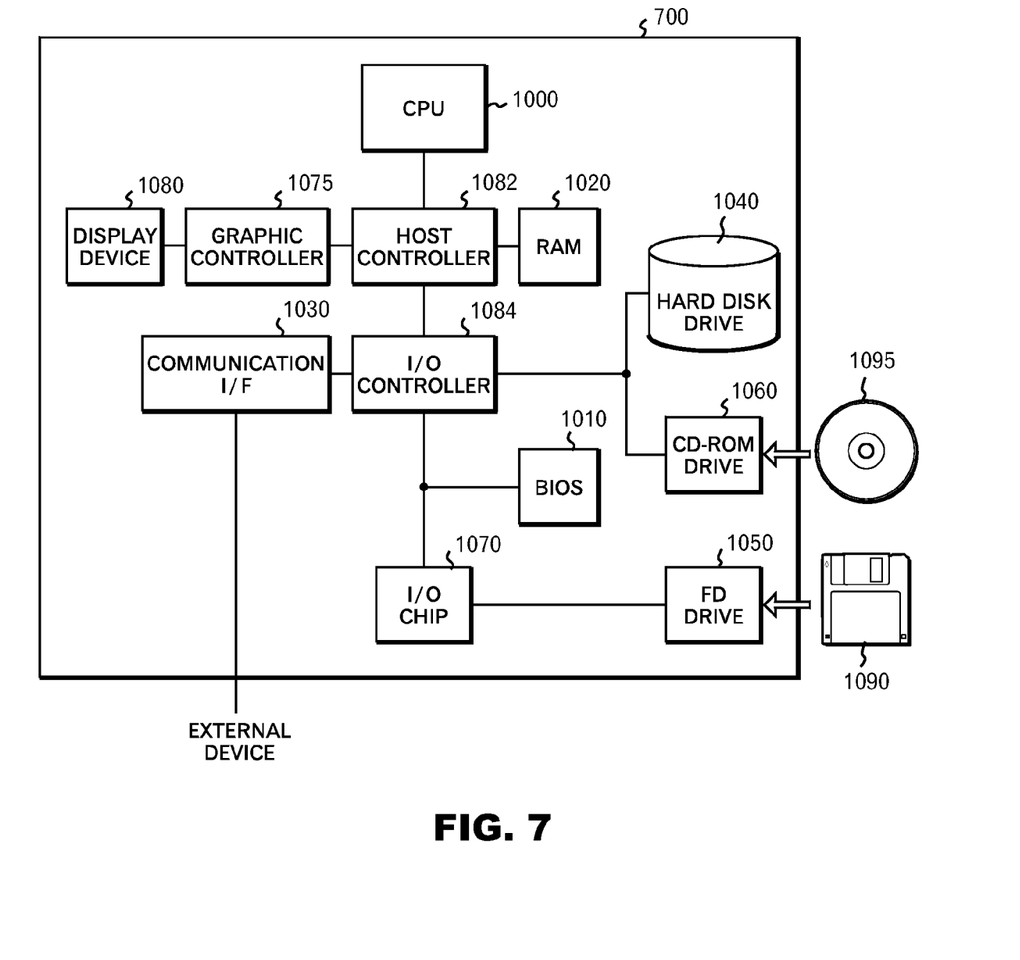
FIG. 7 shows an example of hardware configuration of an information processor 700 which functions as the behavior supporting system 10.

FIG. 7 shows an example of a hardware configuration of an information processor 700 functioning as the behavior supporting system 10. The information processor 700 includes: a CPU periphery having a CPU 1000, a RAM 1020 and a graphic controller 1075, which are mutually connected by a host controller 1082; an input/output section having a communication interface 1030, a hard disc drive 1040, and a CD-ROM drive 1060, which are connected to the host controller 1082 by an input/output controller 1084; and a legacy input/output section having a BIOS 1010, a flexible disc drive 1050, and an input/output chip 1070, which are connected to the input/output controller 1084.

The host controller 1082 connects the RAM 1020 to the CPU 1000 and the graphic controller 1075 which access the RAM 1020 at a high transfer rate. The CPU 1000 is operated based on a program stored in the BIOS 1010 and the RAM 1020, and controls each section. The graphic controller 1075 acquires image data generated on a frame buffer which is provided by the CPU 1000 and the like in the RAM 1020, and displays the image data on a display device 1080. In stead of this, the graphic controller 1075 may internally include the frame buffer which stores image data generated by the CPU 1000 and the like.

The input/output controller 1084 connects the host controller 1082 to the communication interface 1030, the hard disc drive 1040, and the CD-ROM drive 1060, which are relatively high-speed input/output devices. The communication interface 1030 communicates with an external device via a network. The hard disc drive 1040 stores a program or data used by the information processor 700. The CD-ROM drive 1060 reads the program or data from a CD-ROM drive 1095, and provides it for the RAM 1020 or the hard disk drive 1040.

Furthermore, the input/output controller 1084 is connected to the relatively low-speed input/output devices such as the BIOS 1010, the flexible disc drive 1050 and the input/output chip 1070. The BIOS 1010 stores: a boot program executed by the CPU 1000 upon the boot-up of the information processor 700; a program dependent on the hardware of the information processor 700; and the like. The flexible disk drive 1050 reads a program or data from a flexible disk 1090, and provides it for the RAM 1020 or the hard disk drive 1040 via the input/output chip 1070. The input/output chip 1070 connects each type of the input/output devices via the flexible disk 1090, and a parallel port, a serial port, a keyboard port, a mouse port, for example.

A program provided for the information processor 700 is stored in a recording medium such as the flexible disc 1090, the CD-ROM 1095, or an IC card, and is provided by a user. The program is read from the recording medium via the input/output chip 1070 and/or the input/output controller 1084, and is executed by being installed in the information processor 700. The operations to be performed by causing the program to work on the information processor 700 and the like are the same as those in the behavior supporting system 10 described in FIGS. 1 to 6. Thus, the descriptions will be omitted.

The program described above may be stored in an external recording medium. A recording medium can be: an optical recording medium such as a DVD and a PD; a magneto-optical medium such as an MD; a tape medium; a semiconductor memory such as an IC card; and the like, in addition to the flexible disc 1090 and the CD-ROM 1095. Moreover, a recorder such as a hard disc or a RAM provided in a server system which is connected to a dedicated communications network or the Internet may be used as a recording medium, and the program may be provided for the information processor 700 via the network.

The technical scope of the present invention is not limited to the scope as recited in the aforementioned embodiment, although the present invention has been described using the embodiment. It is obvious to those skilled in this art that various modifications and improvements can be added to the aforementioned embodiment. It is clearly understood from description of the scope of claims that embodiments which are obtained by adding any of such various modifications and improvements to the aforementioned embodiment are also included in the technical scope of the present invention.

According to the present invention, it is possible to efficiently calculate a behavioral decision function which instructs behavior for reducing the scale of a loss.

Although the preferred embodiment of the present invention has been described in detail, it should be understood that various changes, substitutions and alternations can be made therein without departing from spirit and scope of the inventions as defined by the appended claims.

What is claimed is:

1. A system for assisting a user to decide what medical policy to undertake to achieve a target that has a cost associated with the target, and thereby minimize an actual cost associated with a user's decision, comprising:
  a computer processor having a data acquiring section and a function generator, wherein
  the data acquiring section acquires the target, behaviors which have already been adapted to the target, and the cost caused as a result of adapting the behaviors to the target as training data for generating a behavioral decision function as a function that determines a medical policy; and
  the function generator generates the behavioral decision function to minimize an expected shortfall of the cost to be obtained as a result of adapting the behaviors to the target, based on the training data, wherein the expected shortfall is determined with a probability of a generation of the cost exceeding a predetermined constant value, and wherein
  the function generator comprises:
  a first calculator that calculates the behavioral decision function by calculating the parameter to minimize an index value, which indicates an upper bound of the expected shortfall based upon a sum of costs exceeding value-at-risk in the training data, and that stores the calculated behavioral decision function in a memory, in the case that a provided value is the value-at-risk of the cost;
  a second calculator that reads the behavioral decision function calculated by the first calculator from the memory and that calculates a value-at-risk of a cost caused as a result of adapting the behavior shown by the behavioral decision function, based on the training data, thus providing the result to the first calculator; and a convergence judgment section that determines expected shortfall based on a convergence of the index value to a value within a predetermined range, wherein the upper bound of the expected shortfall is based on a second index value and minimized by the first calculator and wherein the upper bound is based upon the value-at-risk calculated by the second calculator; and the function generator outputs the parameter of the behavioral decision function calculated by the first calculator and the second calculator on a display device.

2. The system according to claim 1, wherein
the function generator further comprises a third calculator that calculates the behavioral decision function to minimize an expected value of a cost based on the training data; and
the first calculator calculates the behavioral decision function to minimize the index value by subtracting the given value-at-risk from a cost corresponding to each behavior included in the training data and by providing the result for the third calculator.

3. The system according to claim 2, wherein
the first calculator calculates a cost $c^{(i)}$ by subtracting $\alpha'$ being the given value-at-risk from a cost $c^{(i)}$, with respect to a target $x^{(i)}$ and behavior y in the training data, and provides the result for the third calculator; and
the third calculator calculates the behavioral decision function to minimize a cost $C'^E_{\alpha'}(\theta)$.

4. The system according to claim 1, wherein
the first calculator calculates a parameter $\theta$ of the behavioral decision function to minimize an index value $C^E\alpha'(\theta)$, while setting the given value-at-risk at $\alpha'$;
the second calculator calculates $\alpha^E\beta(\theta)$ calculated as a value-at-risk with respect to the calculated parameter $\theta$, and provides the result for the first calculator; and
the convergence judgment section judges whether or not a value calculated has converged to a value within a predetermined range.

5. The system according claim 1 wherein
the behavioral decision function is the function that decides a treatment policy for a patient;
the data acquiring section acquires the scale of a loss, which is caused on each of a plurality of patients, as the training data, for the plurality of patients having already been treated; and
the function generator generates, the behavioral decision function to minimize expected shortfall of a loss caused by a treatment based on the training data.

6. A program causing an information processing apparatus to function as a system that enters a target and that generates a behavioral decision function by quantifying a degree of appropriateness of adapting a behavior to the target and computing a parameter to define the behavioral decision function to be outputted, causing the information processing apparatus to function as:

a data acquiring section including a computer processor that acquires a target and behaviors which have already been adapted to the target, and a cost caused as a result of adopting the behaviors with respect to the target as training data for generating the behavioral decision function; and a function generator that generates the behavioral decision function to minimize expected shortfall of the cost to be obtained as a result of adapting the behaviors with respect to the target, based on the training data, wherein the function generator comprises:

a first calculator that calculates the behavioral decision function by calculating the parameter to minimize an index value, which indicates the upper bound of the expected shortfall based upon a sum of costs exceeding a value-at-risk in the training data, and that stores the calculated behavioral decision function in a memory, in the case that a provided value is the value-at-risk of the cost;

a second calculator that reads the behavioral decision function calculated by the first calculator from the memory, and that calculates a value-at-risk of a cost caused as a result of adapting the behaviors shown by the behavioral decision function, based on the training data, thus providing the result to the first calculator; and a convergence judgment section that judges whether or not expected shortfall based on the index value has been converged to a value within a predetermined range, and the upper bound of the expected shortfall is based on the index value, and minimized by the first calculator, and wherein the upper bound is based upon the value-at-risk calculated by the second calculator, and the first calculator recalculates the parameter to define the behavioral decision for an unconverged shortfall; wherein the function generator outputs the parameter of the behavioral decision function calculated by the first calculator on a display; and the behavioral decision function is a function that determines a treatment policy for a patient.

* * * * *